United States Patent
Kwon et al.

(10) Patent No.: US 10,024,397 B2
(45) Date of Patent: Jul. 17, 2018

(54) PLANETARY GEAR TRAIN OF AUTOMATIC TRANSMISSION FOR VEHICLE

(71) Applicant: Hyundai Motor Company, Seoul (KR)

(72) Inventors: Hyun Sik Kwon, Seoul (KR); Seong Wook Hwang, Gunpo-si (KR); Woochurl Son, Seongnam-si (KR); Wonmin Cho, Hwaseong-si (KR); Jae Chang Kook, Hwaseong-si (KR); Seongwook Ji, Ansan-si (KR)

(73) Assignee: Hyundai Motor Company, Seoul (KR)

( * ) Notice: Subject to any disclaimer, the term of this patent is extended or adjusted under 35 U.S.C. 154(b) by 100 days.

(21) Appl. No.: 15/190,692

(22) Filed: Jun. 23, 2016

(65) Prior Publication Data
US 2017/0152917 A1   Jun. 1, 2017

(30) Foreign Application Priority Data

Nov. 27, 2015 (KR) .................. 10-2015-0167993

(51) Int. Cl.
*F16H 3/66* (2006.01)

(52) U.S. Cl.
CPC .............. *F16H 3/66* (2013.01); *F16H 3/666* (2013.01); *F16H 2200/006* (2013.01); *F16H 2200/201* (2013.01); *F16H 2200/2046* (2013.01); *F16H 2200/2097* (2013.01)

(58) Field of Classification Search
CPC ....... F16H 2200/2097; F16H 2200/201; F16H 2200/2046; F16H 2200/006; F16H 3/66
See application file for complete search history.

(56) References Cited

U.S. PATENT DOCUMENTS

| | | | |
|---|---|---|---|
| 6,425,841 B1 * | 7/2002 | Haka | F16H 3/66 475/275 |
| 8,221,281 B2 | 7/2012 | Wittkopp et al. | |
| 8,651,995 B2 * | 2/2014 | Jang | F16H 3/666 475/275 |
| 2005/0054476 A1 * | 3/2005 | Tiesler | F16H 3/66 475/275 |

FOREIGN PATENT DOCUMENTS

| | | | | |
|---|---|---|---|---|
| JP | 2005127462 A | * | 5/2005 | ............ F16H 3/666 |
| JP | 2011-069396 A | | 4/2011 | |
| JP | 2012-229796 A | | 11/2012 | |
| KR | 10-2012-0003366 A | | 1/2012 | |

* cited by examiner

*Primary Examiner* — Stacey Fluhart
(74) *Attorney, Agent, or Firm* — Morgan, Lewis & Bockius LLP

(57) ABSTRACT

A planetary gear train of an automatic transmission for a vehicle is disclosed. The planetary gear train may include: an input shaft configured for receiving torque of an engine, an output shaft configured for outputting changed torque, a first planetary gear set including a first rotation element, a second rotation element, and a third rotation element, a second planetary gear set including a fourth rotation element, a fifth rotation element, and a sixth rotation element, a third planetary gear set including a seventh rotation element, an eighth rotation element, and a ninth rotation element.

6 Claims, 2 Drawing Sheets

FIG. 2

| Speed stages | C1 | C2 | C3 | C4 | C5 | B1 | Gear ratio |
|---|---|---|---|---|---|---|---|
| D1 | ● |   |   |   | ● | ● | 4.333 |
| D2 | ● |   |   | ● | ● |   | 2.088 |
| D3 | ● |   | ● |   | ● |   | 1.697 |
| D4 | ● |   | ● | ● |   |   | 1.000 |
| D5 | ● | ● |   | ● |   |   | 0.615 |
| D6 | ● | ● | ● |   |   |   | 0.520 |
| D7 |   | ● | ● | ● |   |   | 0.455 |
| D8 |   | ● | ● |   | ● |   | 0.360 |
| REV |   | ● |   |   | ● | ● | -2.063 |

US 10,024,397 B2

PLANETARY GEAR TRAIN OF AUTOMATIC TRANSMISSION FOR VEHICLE

CROSS-REFERENCE TO RELATED APPLICATION

The present application claims priority to and the benefit of Korean Patent Application No. 10-2015-0167993 filed on Nov. 27, 2015, the entire contents of which is incorporated herein for all purposes by this reference.

BACKGROUND OF THE INVENTION

Field of the Invention

The present invention relates to an automatic transmission for a vehicle. More particularly, the present invention relates to a planetary gear train of an automatic transmission for a vehicle that improves power delivery performance and fuel economy by achieving eight forward speed stages with a minimum number of constituent elements being used.

Description of Related Art

Recently increase of oil price is triggering a hard competition in enhancing fuel consumption of a vehicle.

Therefore, many researches for reducing weight and enhancing fuel economy through downsizing of an engine and for securing drivability and fuel economy through multiple speed stages of automatic transmissions have been developed.

However, in the automatic transmission, as the number of speed stages increase, the number of internal components increase, and as a result, mountability, cost, weight, transmission efficiency, and the like may still deteriorate.

Accordingly, development of a planetary gear train which may achieve maximum efficiency with a small number of components may be important in order to increase a fuel economy enhancement effect through the multiple-speeds.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a planetary gear train of an automatic transmission for a vehicle having advantages of improving power delivery performance and fuel economy by achieving eight forward speed stages and one reverse speed stage.

Another embodiment of the present invention provides a planetary gear train of an automatic transmission for a vehicle having further advantages of improving silent driving of the vehicle by using operation point positioned at a low rotational speed region of an engine.

A planetary gear train of an automatic transmission for a vehicle according to an exemplary embodiment of the present invention may include: an input shaft receiving torque of an engine; an output shaft outputting changed torque; a first planetary gear set including first, second, and third rotation elements; a second planetary gear set including fourth, fifth, and sixth rotation elements; a third planetary gear set including seventh, eighth, and ninth rotation elements; a first rotation shaft directly connecting the first rotation element to the seventh rotation element and selectively connectable to the input shaft; a second rotation shaft directly connecting the second rotation element to the ninth rotation element and selectively connectable to a transmission housing; a third rotation shaft directly connected to the third rotation element; a fourth rotation shaft directly connected to the fourth rotation element and selectively connectable to the second rotation shaft or the third rotation shaft; a fifth rotation shaft directly connected to the fifth rotation element and selectively connectable to the input shaft or the third rotation shaft; a sixth rotation shaft directly connected to the sixth rotation element and directly connected to the transmission housing; and a seventh rotation shaft directly connected to the eighth rotation element and directly connected to the output shaft.

The first planetary gear set may be a single pinion planetary gear set, wherein the first rotation element is a first sun gear, the second rotation element is a first planet carrier, and the third rotation element is a first ring gear. The second planetary gear set may be a double pinion planetary gear set, wherein the fourth rotation element is a second sun gear, the fifth rotation element is a second ring gear, and the sixth rotation element is a second planet carrier. The third planetary gear set may be a single pinion planetary gear set, wherein the seventh rotation element is a third sun gear, the eighth rotation element is a third planet carrier, and the ninth rotation element is a third ring gear.

The planetary gear train may further include: a first clutch selectively connecting the input shaft to the first rotation shaft; a second clutch selectively connecting the input shaft to the fifth rotation shaft; a third clutch selectively connecting the second rotation shaft to the fourth rotation shaft; a fourth clutch selectively connecting the third rotation shaft to the fourth rotation shaft; a fifth clutch selectively connecting the third rotation shaft to the fifth rotation shaft; and a first brake selectively connecting the second rotation shaft to the transmission housing.

A first forward speed stage may be achieved by simultaneous operation of the first and fifth clutches and the first brake, a second forward speed stage may be achieved by simultaneous operation of the first, fourth, and fifth clutches, a third forward speed stage may be achieved by simultaneous operation of the first, third, and fifth clutches, a fourth forward speed stage may be achieved by simultaneous operation of the first, third, and fourth clutches, a fifth forward speed stage may be achieved by simultaneous operation of the first, second, and fourth clutches, a sixth forward speed stage may be achieved by simultaneous operation of the first, second, and third clutches, a seventh forward speed stage may be achieved by simultaneous operation of the second, third, and fourth clutches, an eighth forward speed stage may be achieved by simultaneous operation of the second, third, and fifth clutches, and a reverse speed stage may be achieved by simultaneous operation of the second and fifth clutches and the first brake.

A planetary gear train of an automatic transmission for a vehicle according to another exemplary embodiment of the present invention may include: an input shaft receiving torque of an engine; an output shaft outputting changed torque; a first planetary gear set including first, second, and third rotation elements; a second planetary gear set including fourth, fifth, and sixth rotation elements, and a third planetary gear set including seventh, eighth, and ninth rotation elements, wherein the first rotation element is directly connected to the seventh rotation element and is selectively connectable to the input shaft, the second rotation element is directly connected to the ninth rotation element and is selectively connectable to a transmission housing, the third rotation element is selectively connectable to the fourth rotation element or the fifth rotation element, the fourth rotation element is selectively connectable to the ninth rotation element, the fifth rotation element is selectively connectable to the input shaft, the sixth rotation element is directly connected to the transmission housing, the eighth rotation element is directly connected to the output shaft.

The first planetary gear set may be a single pinion planetary gear set, wherein the first rotation element is a first sun gear, the second rotation element is a first planet carrier, and the third rotation element is a first ring gear. The second planetary gear set may be a double pinion planetary gear set, wherein the fourth rotation element is a second sun gear, the fifth rotation element is a second ring gear, and the sixth rotation element is a second planet carrier. The third planetary gear set may be a single pinion planetary gear set, wherein the seventh rotation element is a third sun gear, the eighth rotation element is a third planet carrier, and the ninth rotation element is a third ring gear.

The planetary gear train may further include: a first clutch selectively connecting the input shaft to the first rotation element; a second clutch selectively connecting the input shaft to the fifth rotation element; a third clutch selectively connecting the fourth rotation element to the ninth rotation element; a fourth clutch selectively connecting the third rotation element to the fourth rotation element; a fifth clutch selectively connecting the third rotation element to the fifth rotation element; and a first brake selectively connecting the ninth rotation element to the transmission housing.

A first forward speed stage may be achieved by simultaneous operation of the first and fifth clutches and the first brake, a second forward speed stage may be achieved by simultaneous operation of the first, fourth, and fifth clutches, a third forward speed stage may be achieved by simultaneous operation of the first, third, and fifth clutches, a fourth forward speed stage may be achieved by simultaneous operation of the first, third, and fourth clutches, a fifth forward speed stage may be achieved by simultaneous operation of the first, second, and fourth clutches, a sixth forward speed stage may be achieved by simultaneous operation of the first, second, and third clutches, a seventh forward speed stage may be achieved by simultaneous operation of the second, third, and fourth clutches, an eighth forward speed stage may be achieved by simultaneous operation of the second, third, and fifth clutches, and a reverse speed stage may be achieved by simultaneous operation of the second and fifth clutches and the first brake.

The planetary gear train according to the exemplary embodiment of the present invention may achieve eight forward speed stages and one reverse speed stage by combining three planetary gear sets being simple planetary gear sets with six control elements.

In addition, the planetary gear train according to the exemplary embodiment of the present invention may improve silent driving because speed stages suitable to a rotational speed of the engine is achieved due to multiple-speed stages of the automatic transmission.

In addition, the planetary gear train according to the exemplary embodiment of the present invention may maximize driving efficiency of the engine and may improve power delivery performance and fuel consumption.

Other effects obtainable or predictable from an exemplary embodiment of the present invention will be explicitly or implicitly described in a DETAILED DESCRIPTION section. That is, various effects predictable from an exemplary embodiment of the present invention will be described in the DETAILED DESCRIPTION section.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operation chart of control elements at each speed stage in the planetary gear train according to an exemplary embodiment of the present invention.

Figure 1:
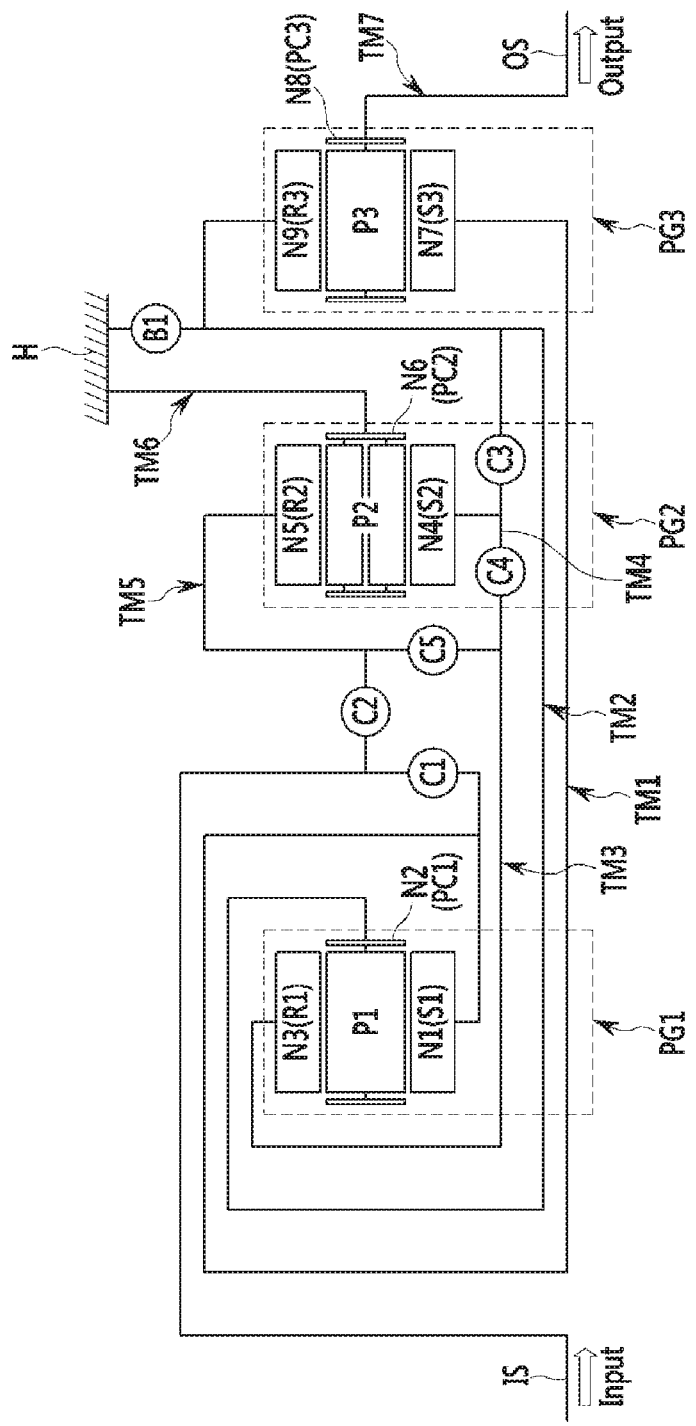
FIG. 1 is a schematic diagram of a planetary gear train according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Parts which are not related with the description are omitted for clearly describing the exemplary embodiments of the present invention and like reference numerals refer to like or similar elements throughout the specification.

In the following description, dividing names of components into first, second, and the like is to divide the names because the names of the components are the same as each other and an order thereof is not particularly limited.

FIG. 1 is a schematic diagram of a planetary gear train according to an exemplary embodiment of the present invention.

Referring to FIG. 1, a planetary gear train according to an exemplary embodiment of the present invention includes first, second, and third planetary gear sets PG1, PG2, and PG3 disposed on the same axis, an input shaft IS, an output shaft OS, seven rotation shafts TM1 to TM7 connected to at least one of rotation elements of the first, second, and third planetary gear sets PG1, PG2, and PG3, six control elements C1 to C5 and B1, and a transmission housing H.

Torque input from the input shaft IS is changed by cooperation of the first, second, and third planetary gear sets PG1, PG2, and PG3 and the changed torque is output through the output shaft OS.

The planetary gear sets are disposed in a sequence of the first, second, and third planetary gear sets PG1, PG2, and PG3 from an engine.

The input shaft IS is an input member and the torque from a crankshaft of an engine, after being torque-converted through a torque converter, is input into the input shaft IS.

The output shaft OS is an output member, is disposed in parallel with the input shaft IS, and transmits driving torque to a driving wheel through a differential apparatus.

The first planetary gear set PG1 is a single pinion planetary gear set and includes a first sun gear S1, a first planet carrier PC1 rotatably supporting a first pinion P1 that is externally meshed with the first sun gear S1, and a first ring gear R1 that is internally meshed with the first pinion P1 respectively as first, second, and third rotation elements N1, N2, and N3.

The second planetary gear set PG2 is a double pinion planetary gear set and includes a second sun gear S2, a second ring gear R2 internally engaged with a second pinion P2 externally engaged with the second sun gear S2, and a second planet carrier PC2 rotatably supporting the second pinion P2 as fourth, fifth, and sixth rotation elements N4, N5, and N6.

The third planetary gear set PG3 is a single pinion planetary gear set and includes a third sun gear S3, a third planet carrier PC3 rotatably supporting a third pinion P3 that is externally meshed with the third sun gear S3, and a third ring gear R3 that is internally meshed with the third pinion P3 respectively as seventh, eighth, and ninth rotation elements N7, N8, and N9.

The first rotation element N1 is directly connected to the seventh rotation element N7 and the second rotation element N2 is directly connected to the ninth rotation element N9 such that the first, second, and third planetary gear sets PG1, PG2, and PG3 include seven rotation shafts TM1 to TM7.

The seven rotation shafts TM1 to TM7 will be described in detail.

The first rotation shaft TM1 directly connects the first rotation element N1 (first sun gear S1) with the seventh rotation element N7 (third sun gear S3), and is selectively connectable to the input shaft IS.

The second rotation shaft TM2 directly connects the second rotation element N2 (first planet carrier PC1) with the ninth rotation element N9 (third ring gear R3) and is selectively connectable to the transmission housing H.

The third rotation shaft TM3 is directly connected to the third rotation element N3 (first ring gear R1).

The fourth rotation shaft TM4 is directly connected to the fourth rotation element N4 (second sun gear S2) and is selectively connectable to the second rotation shaft TM2 or the third rotation shaft TM3.

The fifth rotation shaft TM5 is directly connected to the fifth rotation element N5 (second ring gear R2) and is selectively connectable to the input shaft IS or the third rotation shaft TM3.

The sixth rotation shaft TM6 is directly connected to the sixth rotation element N6 (second planet carrier PC2) and is directly connected to the transmission housing H.

The seventh rotation shaft TM7 is directly connected to the eighth rotation element N8 (third planet carrier PC3) and is directly connected to the output shaft OS.

In addition, five clutches C1, C2, C3, C4, and C5 that are control elements are disposed at portions at which two rotation shafts among the rotation shafts TM1 to TM7 are selectively connectable to each other, and a brake B1 that is a control element is disposed at a portion at which any one rotation shaft among the rotation shaft TM1 to TM7 is selectively connectable to the transmission housing H.

Arrangements of the six control elements C1 to C5 and B1 are described in detail.

The first clutch C1 is disposed between the input shaft IS and the first rotation shaft TM1 and selectively connects the input shaft IS to the first rotation shaft TM1.

The second clutch C2 is disposed between the input shaft IS and the fifth rotation shaft TM5 and selectively connects the input shaft IS to the fifth rotation shaft TM5.

The third clutch C3 is disposed between the second rotation shaft TM2 and the fourth rotation shaft TM4 and selectively connects the second rotation shaft TM2 to the fourth rotation shaft TM4.

The fourth clutch C4 is disposed between the third rotation shaft TM3 and the fourth rotation shaft TM4 and selectively connects the third rotation shaft TM3 to the fourth rotation shaft TM4.

The fifth clutch C5 is disposed between the third rotation shaft TM3 and the fifth rotation shaft TM5 and selectively connects the third rotation shaft TM3 to the fifth rotation shaft TM5.

The first brake B1 is disposed between the second rotation shaft TM2 and the transmission housing H and selectively connects the second rotation shaft TM2 to the transmission housing H.

The control elements including the first, second, third, fourth, and fifth clutches C1, C2, C3, C4, and C5 and the first brake B1 may be multi-plates friction elements of wet type that are operated by hydraulic pressure.

FIG. 2 is an operation chart of control elements at each speed stage in the planetary gear train according to an exemplary embodiment of the present invention.

As shown in FIG. 2, three control elements are operated at each speed stage in the planetary gear train according to the exemplary embodiment of the present invention.

The first and fifth clutches C1 and C5 and the first brake B1 are simultaneously operated at a first forward speed stage D1. In a state that the input shaft IS is connected with the first rotation shaft TM1 by operation of the first clutch C1 and the third rotation shaft TM3 is connected to the fifth rotation shaft TM5 by operation of the fifth clutch C5, torque of the input shaft IS is input to the first rotation shaft TM1. In addition, the sixth rotation shaft TM6 is operated as the fixed element and the second rotation shaft TM2 is operated as the fixed element by operation of the first brake B1. Therefore, the torque of the input shaft IS is shifted into the first forward speed stage, and the first forward speed stage is output to the output shaft OS through the seventh rotation shaft TM7.

The first, fourth, and fifth clutches C1, C4, and C5 are simultaneously operated at a second forward speed stage D2. In a state that the input shaft IS is connected to the first rotation shaft TM1 by operation of the first clutch C1, the third rotation shaft TM3 is connected to the fourth rotation shaft TM4 by operation of the fourth clutch C4, and the third rotation shaft TM3 is connected to the fifth rotation shaft TM5 by operation of the fifth clutch C5, the torque of the input shaft IS is input to the first rotation shaft TM1. In addition, the sixth rotation shaft TM6 is operated as the fixed element. Therefore, the torque of the input shaft IS is shifted into the second forward speed stage, and the second forward speed stage is output to the output shaft OS through the seventh rotation shaft TM7.

The first, third, and fifth clutches C1, C3, and C5 are simultaneously operated at a third forward speed stage D3. In a state that the input shaft IS is connected to the first rotation shaft TM1 by operation of the first clutch C1, the second rotation shaft TM2 is connected to the fourth rotation shaft TM4 by operation of the third clutch C3, and the third rotation shaft TM3 is connected to the fifth rotation shaft TM5 by operation of the fifth clutch C5, the torque of the input shaft IS is input to the first rotation shaft TM1. In addition, the sixth rotation shaft TM6 is operated as the fixed element. Therefore, the torque of the input shaft IS is shifted into the third forward speed stage, and the third forward speed stage is output to the output shaft OS through the seventh rotation shaft TM7.

The first, third, and fourth clutches C1, C3, and C4 are simultaneously operated at a fourth forward speed stage D4. In a state that the input shaft IS is connected to the first rotation shaft TM1 by operation of the first clutch C1, the second rotation shaft TM2 is connected to the fourth rotation shaft TM4 by operation of the third clutch C3, and the third rotation shaft TM3 is connected to the fourth rotation shaft TM4 by operation of the fourth clutch C4, the torque of the input shaft IS is input to the first rotation shaft TM1. In addition, the sixth rotation shaft TM6 is operated as the fixed element. Therefore, the torque of the input shaft IS is shifted into the fourth forward speed stage, and the fourth forward speed stage is output to the output shaft OS through the seventh rotation shaft TM7. The same rotation speed as the input shaft IS is output at the fourth forward speed stage.

The first, second, and fourth clutches C1, C2, and C4 are simultaneously operated at a fifth forward speed stage D5. In a state that the input shaft IS is connected to the first rotation shaft TM1 by operation of the first clutch C1, the input shaft IS is connected to the fifth rotation shaft TM5 by operation of the second clutch C2, and the third rotation shaft TM3 is connected to the fourth rotation shaft TM4 by operation of the fourth clutch C4, the torque of the input shaft IS is input to the first and fifth rotation shafts TM1 and TM5. In addition, the sixth rotation shaft TM6 is operated as the fixed element. Therefore, the torque of the input shaft IS is shifted into the fifth forward speed stage, and the fifth forward speed stage is output to the output shaft OS through the seventh rotation shaft TM7.

The first, second, and third clutches C1, C2, and C3 are simultaneously operated at a sixth forward speed stage D6. In a state that the input shaft IS is connected to the first rotation shaft TM1 by operation of the first clutch C1, the input shaft IS is connected to the fifth rotation shaft TM5 by operation of the second clutch C2, and the second rotation shaft TM2 is connected to the fourth rotation shaft TM4 by operation of the third clutch C3, the torque of the input shaft IS is input to the first and fifth rotation shafts TM1 and TM5. In addition, the sixth rotation shaft TM6 is operated as the fixed element. Therefore, the torque of the input shaft IS is shifted into the sixth forward speed stage, and the sixth forward speed stage is output to the output shaft OS through the seventh rotation shaft TM7.

The second, third, and fourth clutches C2, C3, and C4 are simultaneously operated at a seventh forward speed stage D7. In a state that the input shaft IS is connected to the fifth rotation shaft TM5 by operation of the second clutch C2, the second rotation shaft TM2 is connected to the fourth rotation shaft TM4 by operation of the third clutch C3, and the third rotation shaft TM3 is connected to the fourth rotation shaft TM4 by operation of the fourth clutch C4, the torque of the input shaft IS is input to the fifth rotation shaft TM5. In addition, the sixth rotation shaft TM6 is operated as the fixed element. Therefore, the torque of the input shaft IS is shifted into the seventh forward speed stage, and the seventh forward speed stage is output to the output shaft OS through the seventh rotation shaft TM7.

The second, third, and fifth clutches C2, C3, and C5 are simultaneously operated at an eighth forward speed stage D8. In a state that the input shaft IS is connected to the fifth rotation shaft TM5 by operation of the second clutch C2, the second rotation shaft TM2 is connected to the fourth rotation shaft TM4 by operation of the third clutch C3, and the third rotation shaft TM3 is connected to the fifth rotation shaft TM5 by operation of the fifth clutch C5, the torque of the input shaft IS is input to the fifth rotation shaft TM5. In addition, the sixth rotation shaft TM6 is operated as the fixed element. Therefore, the torque of the input shaft IS is shifted into the eighth forward speed stage, and the eighth forward speed stage is output to the output shaft OS through the seventh rotation shaft TM7.

The second and fifth clutches C2 and C5 and the first brake B1 are simultaneously operated at a reverse speed stage REV. In a state that the input shaft IS is connected to the fifth rotation shaft TM5 by operation of the second clutch C2 and the third rotation shaft TM3 is connected to the fifth rotation shaft TM5 by operation of the fifth clutch C5, the torque of the input shaft IS is input to the fifth rotation shaft TM5. In addition, the sixth rotation shaft TM6 is operated as the fixed element and the second rotation shaft TM2 is operated as the fixed element by operation of the first brake B1. Therefore, the torque of the input shaft IS is shifted into the reverse speed stage, and the reverse speed stage is output to the output shaft OS through the seventh rotation shaft TM7.

The planetary gear train according to the exemplary embodiment of the present invention may achieve at least eight forward speed stages and one reverse speed stage by combining three planetary gear sets PG1, PG2, and PG3 with five clutches C1, C2, C3, C4, and C5 and one brake B1.

In addition, the planetary gear train according to the exemplary embodiment of the present invention may improve silent driving because speed stages suitable to a rotational speed of the engine is achieved due to multiple-speed stages of the automatic transmission.

In addition, the planetary gear train according to the exemplary embodiment of the present invention may maximize driving efficiency of the engine and may improve power delivery performance and fuel consumption.

For convenience in explanation and accurate definition in the appended claims, the terms "upper", "lower", "inner". "outer", "up", "down", "upper", "lower", "upwards", "downwards", "front", "rear", "back", "inside", "outside", "inwardly", "outwardly", "interior", "exterior". "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of an automatic transmission for a vehicle comprising:
   an input shaft configured for receiving torque of an engine;
   an output shaft configured for outputting changed torque;
   a first planetary gear set including a first rotation element, a second rotation element, and a third rotation element;
   a second planetary gear set including a fourth rotation element, a fifth rotation element, and a sixth rotation element;
   a third planetary gear set including a seventh rotation element, an eighth rotation element, and a ninth rotation element;
   a first rotation shaft directly connecting the first rotation element to the seventh rotation element and selectively connectable to the input shaft;
   a second rotation shaft directly connecting the second rotation element to the ninth rotation element and selectively connectable to a transmission housing;
   a third rotation shaft directly connected to the third rotation element;
   a fourth rotation shaft directly connected to the fourth rotation element, selectively connectable to the second rotation shaft, and selectively connectable to the third rotation shaft;
   a fifth rotation shaft directly connected to the fifth rotation element, selectively connectable to the input shaft, and selectively connectable to the third rotation shaft;
   a sixth rotation shaft directly connected to the sixth rotation element and directly connected to the transmission housing; and
   a seventh rotation shaft directly connected to the eighth rotation element and directly connected to the output shaft,
   wherein the first planetary gear set is a single pinion planetary gear set, the first rotation element is a first sun gear, the second rotation element is a first planet carrier, and the third rotation element is a first ring gear,
   wherein the second planetary gear set is a double pinion planetary gear set, the fourth rotation element is a second sun gear, the fifth rotation element is a second ring gear, and the sixth rotation element is a second planet carrier, and
   wherein the third planetary gear set is a single pinion planetary gear set, the seventh rotation element is a third sun gear, the eighth rotation element is a third planet carrier, and the ninth rotation element is a third ring gear.

2. The planetary gear train of claim 1, further comprising:
   a first clutch selectively connecting the input shaft to the first rotation shaft;
   a second clutch selectively connecting the input shaft to the fifth rotation shaft;
   a third clutch selectively connecting the second rotation shaft to the fourth rotation shaft;
   a fourth clutch selectively connecting the third rotation shaft to the fourth rotation shaft;
   a fifth clutch selectively connecting the third rotation shaft to the fifth rotation shaft; and
   a first brake selectively connecting the second rotation shaft to the transmission housing.

3. The planetary gear train of claim 2, wherein a first forward speed stage is achieved by operation of the first and fifth clutches and the first brake,
   a second forward speed stage is achieved by operation of the first, fourth, and fifth clutches,
   a third forward speed stage is achieved by operation of the first, third, and fifth clutches,
   a fourth forward speed stage is achieved by operation of the first, third, and fourth clutches,
   a fifth forward speed stage is achieved by operation of the first, second, and fourth clutches,
   a sixth forward speed stage is achieved by operation of the first, second, and third clutches,
   a seventh forward speed stage is achieved by operation of the second, third, and fourth clutches,
   an eighth forward speed stage is achieved by operation of the second, third, and fifth clutches, and
   a reverse speed stage is achieved by operation of the second and fifth clutches and the first brake.

4. A planetary gear train of an automatic transmission for a vehicle comprising:
   an input shaft configured for receiving torque of an engine;
   an output shaft configured for outputting changed torque;
   a first planetary gear set including a first rotation element, a second rotation element, and a third rotation element;
   a second planetary gear set including a fourth rotation element, a fifth rotation element, and a sixth rotation element; and
   a third planetary gear set including a seventh rotation element, an eighth rotation element, and a ninth rotation element,
   wherein the first rotation element is directly connected to the seventh rotation element and is selectively connectable to the input shaft,
   the second rotation element is directly connected to the ninth rotation element and is selectively connectable to a transmission housing,
   the third rotation element is selectively connectable to the fourth rotation element and selectively connectable to the fifth rotation element,
   the fourth rotation element is selectively connectable to the ninth rotation element,
   the fifth rotation element is selectively connectable to the input shaft,
   the sixth rotation element is directly connected to the transmission housing,
   the eighth rotation element is directly connected to the output shaft,
   wherein the first planetary gear set is a single pinion planetary gear set, the first rotation element is a first sun gear, the second rotation element is a first planet carrier, and the third rotation element is a first ring gear,
   wherein the second planetary gear set is a double pinion planetary gear set, the fourth rotation element is a second sun gear, the fifth rotation element is a second ring gear, and the sixth rotation element is a second planet carrier, and
   wherein the third planetary gear set is a single pinion planetary gear set, the seventh rotation element is a third sun gear, the eighth rotation element is a third planet carrier, and the ninth rotation element is a third ring gear.

5. The planetary gear train of claim 4, further comprising:
   a first clutch selectively connecting the input shaft to the first rotation element;

a second clutch selectively connecting the input shaft to the fifth rotation element;

a third clutch selectively connecting the fourth rotation element to the ninth rotation element;

a fourth clutch selectively connecting the third rotation element to the fourth rotation element;

a fifth clutch selectively connecting the third rotation element to the fifth rotation element; and a first brake selectively connecting the ninth rotation element to the transmission housing.

6. The planetary gear train of claim 5, wherein a first forward speed stage is achieved by operation of the first and fifth clutches and the first brake, a second forward speed stage is achieved by operation of the first, fourth, and fifth clutches, a third forward speed stage is achieved by operation of the first, third, and fifth clutches, a fourth forward speed stage is achieved by operation of the first, third, and fourth clutches, a fifth forward speed stage is achieved by operation of the first, second, and fourth clutches, a sixth forward speed stage is achieved by operation of the first, second, and third clutches, a seventh forward speed stage is achieved by operation of the second, third, and fourth clutches, an eighth forward speed stage is achieved by operation of the second, third, and fifth clutches, and a reverse speed stage is achieved by operation of the second and fifth clutches and the first brake.

* * * * *